United States Patent [19]

Neuenschwander

[11] Patent Number: 4,539,485
[45] Date of Patent: Sep. 3, 1985

[54] WAVE ACTIVATED GENERATOR

[76] Inventor: Victor L. Neuenschwander, Box 1098, Bloomfield, N. Mex. 87413

[21] Appl. No.: 540,602

[22] Filed: Oct. 7, 1983

[51] Int. Cl.$^3$ .............................................. F03B 13/12
[52] U.S. Cl. ...................................... 290/53; 417/333
[58] Field of Search ................... 290/42, 53; 417/100, 417/330, 331, 333; 60/497, 501, 502

[56] References Cited

U.S. PATENT DOCUMENTS

| | | | |
|---|---|---|---|
| 3,362,336 | 1/1968 | Kafka | 290/42 |
| 3,988,592 | 10/1976 | Porter | 417/330 |
| 4,249,084 | 2/1981 | Villanueva et al. | 417/331 |
| 4,379,235 | 4/1983 | Trepl, II | 60/502 |

Primary Examiner—William M. Shoop, Jr.
Assistant Examiner—W. E. Duncanson, Jr.
Attorney, Agent, or Firm—Harvey B. Jacobson

[57] ABSTRACT

A wave activated generator utilizes the principle of providing relative movement between a permanent magnet and a coil to induce an electrical current in the coil. The coil is situated in a static tube anchored to the sea bed by means of a ballast tank at the base of the tube and guy wires extending from the tube. A plunger with permanent magnets is mounted in the tube for vertical reciprocation of the plunger, the plunger projecting outwardly from the upper end of the tube and terminating in a hull-shaped float which rides the water surface and provides vertical reciprocation of the plunger responsive to wave motion in order to move the magnets relative to the coil and generate current in the coil.

12 Claims, 4 Drawing Figures

4,539,485

WAVE ACTIVATED GENERATOR

BACKGROUND OF THE INVENTION

In times of escalating energy costs, and depletion of fossil fuels, the generation of electrical power from the earth's naturally occurring resources takes on increasing significance. The present invention relates to electrical generator apparatus adapted to be installed in the sea to operate on wave power.

STATEMENT OF PRIOR ART

The art is replete with schemes for taking advantage of wave motion in the sea to generate electrical power. Examples of prior proposals are illustrated in the U.S. patents listed below. None of the prior proposals, however, is believed to disclose a wave operated electrical generator having the features of the present invention which provides a simple-to-construct and install, and efficiently operating undersea installation.

U.S. Pat. Nos. 628,457; 3,231,749; 3,546,473; 3,783,302; 4,232,230; 4,260,901.

SUMMARY OF THE INVENTION

The invention utilizes the principle of providing relative movement between a permanent magnet and a coil to induce an electrical current in the coil, in a wave-operated generator, by providing an elongate coil in a static tube which may be anchored to the sea bed by means of a ballast tank at the base of the tube, and guy wires extending from the tube to stakes or other anchoring means in the sea bed, and a plunger carrying at least one permanent magnet and being mounted in the tube for vertical reciprocation, the plunger projecting outwardly from the upper end of the tube and terminating in a hullshaped float which rides the water surface and provides vertical reciprocation of the plunger responsive to wave motion thereby inducing an electrical current in the coil which may be collected by a suitable power take-off.

The plunger may be freely rotatably mounted in the tube so that the float may effectively align with the waves, and the tube may be effectively sealed against ingress of sea water. The unit provides maximum plunger lift in the available wave motion, allowing a maximum number of magnets to be used, and the coil can be of a height to accommodate tidal fluctuations so that the apparatus may generate current continually. The device is adaptable to various wave heights and is not subject to horizontal displacement.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
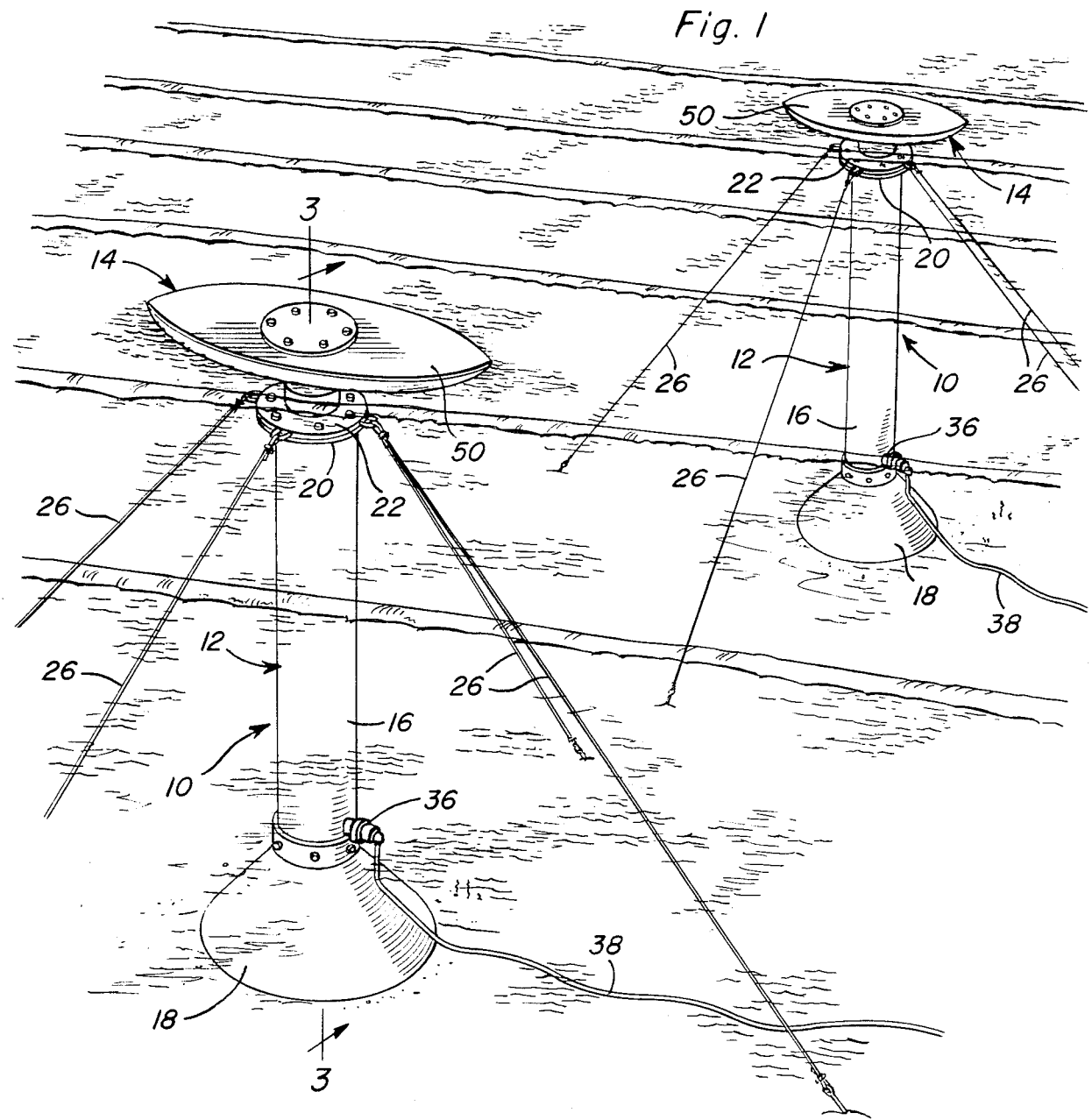
FIG. 1 is a perspective view illustrating a pair of undersea wave-activated electrical generators in accordance with the invention.
Figure 2:
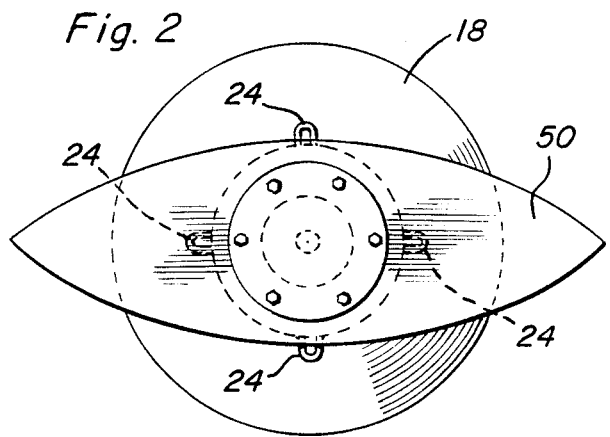
FIG. 2 is a plan view of one of the generators.
Figure 4:
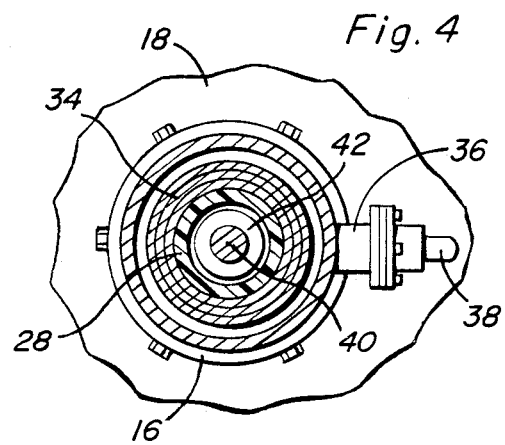
FIG. 4 is a sectional view on line 4—4 of FIG. 3.
Figure 3:
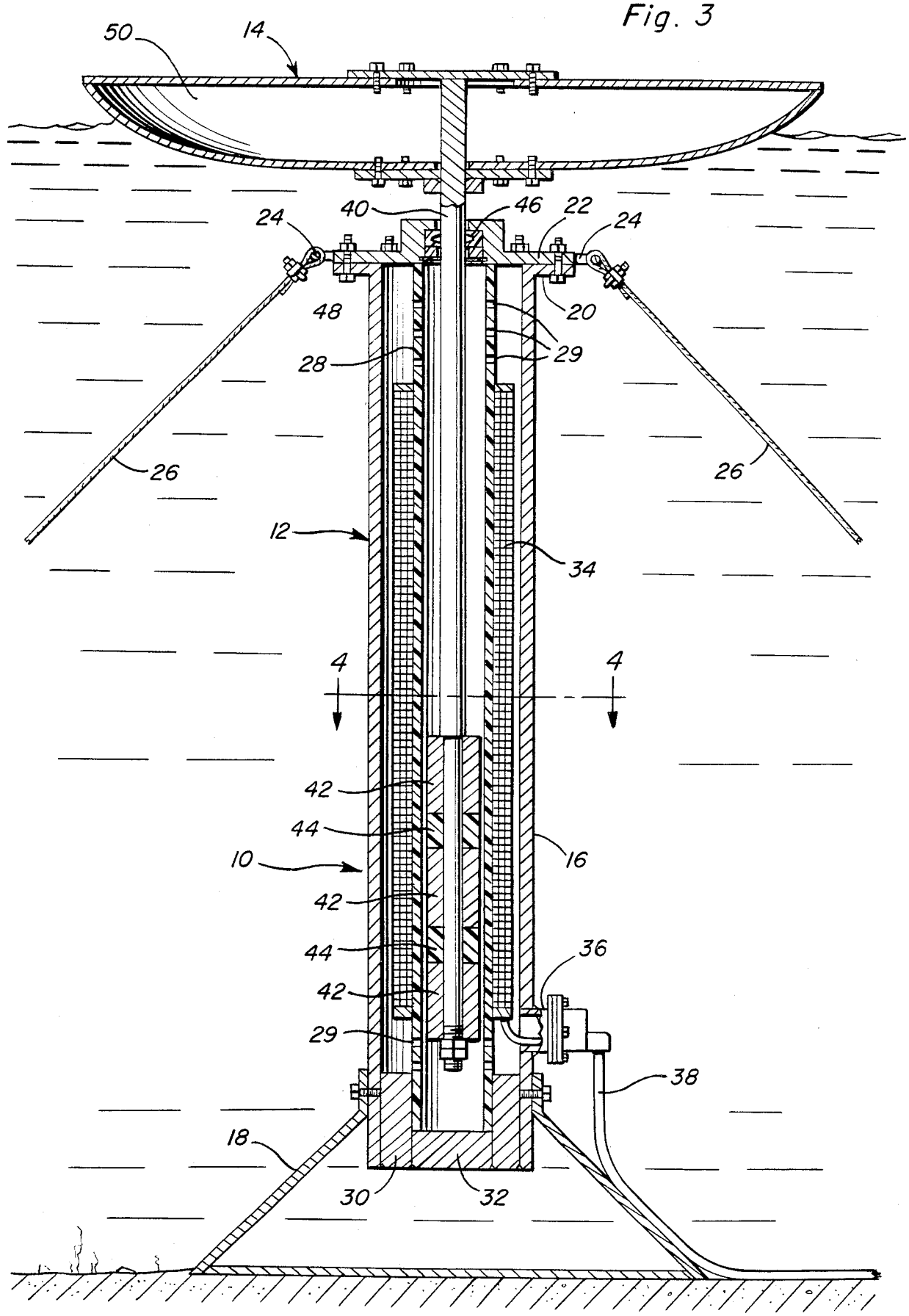
FIG. 3 is a sectional view to an enlarged scale of the one generator on line 3—3 of FIG. 1.

As illustrated in FIG. 1, a pair of electric generators 10 in accordance with the invention are anchored on a seabed to be activated by wave power. Each generator comprises a static tube assembly 12 anchored on the seabed, and a float assembly 14 which rises and falls responsive to wave motion to generate electricity by magnetic induction, as will be described.

Each tube assembly 12 comprises an outer tube 16 having a hollow conical ballast foot 18 at the base, filled with suitable ballast, and resting on the seabed. The upper end of the tube 16 has a flange 20 to which is bolted a cover 22 with attachment rings 24 for guy wires 26 which, in conjunction with the ballast foot, firmly anchor and laterally stabilize the apparatus on the seabed.

Internally of tube 16, tube assembly 12 includes an inner, non-magnetic, self-lubricating guide tube 28 suitably supported and located at the base of the tube 16 by sleeve 30 and end plate 32, for example, and extending the entire length of tube 16. Inner tube 28 is surrounded along the major portion of its length with a magnetic induction coil 34, e.g. of copper wire, the ends of which extend out from the apparatus through a suitably sealed outlet 36 and an insulated conduit 38 for connection to suitable electrical apparatus. The tube 28 may be provided with vent openings 29 for air circulation to the coil, and to prevent air lock. The apparatus may be nitrogen filled.

Float assembly 14 comprises a plunger rod 40 having a series of permanent magnets 42 interspaced with insulators 44 at its lower end, the rod being freely rotatably received in tube 28 for vertical reciprocation responsive to wave motion, and extending through a water-excluding and rod supporting and aligning seal assembly comprising soft compound seal 46 and a support bushing 48 received in a seal chamber formed in cover 22. At its upper end, rod 40 carries a hollow float 50 which, in accordance with an important feature of the invention, is navicular or hull-shaped form with a flat elliptical upper surface. The float is secured in suitably sealed manner to rod 40 by any convenient means well known in the art.

The vertical dimensions of the generator are designed such that float 50 rests on the sea surface so as to rise and fall with the motion of incoming waves, thereby inducing an electric current in coil 28 in known manner by the reciprocating motion of magnets 42 within the coil. The electrical output may be rectified or utilized directly. The freely rotatable nature of float assembly 14 allows the float 50 to self-align with the waves, and the hull-shaped form of the float is instrumental in providing efficient self-alignment, and optimum lift from a wave thereby maximizing the electrical output. The cross-section of the elliptical float (in plan) should not be greater than a single wave, in order to maintain wave-induced reciprocation. A float of this nature can provide increased lift as compared with a float of circular cross-section.

The number of magnets, float size, and length of coil can be varied dependent on the application. Dependent on the length of the coil, the structure can be self-compensating as regards tidal variation, so that continual, around-the-clock electrical generation can be provided. The device is of relatively simple, rugged design, is self-sealing (thereby being capable of excluding abrasive sea water inclusions) and self-lubricating, has an efficient anchoring system resistant to lateral currents, and does not require the support of a platform or other support structure. The float design produces optimum lift from a wave, allowing an optimum number of magnets to be used, and the float is self-adjusting as to wave height and variations.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is new is as follows:

1. An electrical generator structure adapted to be mounted in the sea for actuation by wave motion comprising an elongate static tube assembly, means for anchoring the tube assembly in vertically extending relation on a seabed, an electrical induction coil extending lengthwise within the tube assembly, means for providing connection of the respective ends of the coil with electrical apparatus external to the tube assembly, a rod vertically reciprocably received within the tube assembly, the rod having an upper end portion projecting from an upper end of the tube assembly, at least one magnet on the rod internally of the coil, and a float on the upper end portion of the rod adapted to be located at the water surface so as to rise and fall responsive to wave motion thereby providing vertical reciprocation of the magnet effective to induce an electrical current in the coil, wherein the float is of elongate navicular hull-shaped form, having a lenticular-shaped upper surface and a hull-shaped lower surface and the rod is freely rotatably mounted in the tube structure.

2. The invention of claim 1 wherein the upper surface of the float is flat.

3. The invention of claim 1 wherein the rod is received in the tube assembly through liquid-excluding and rod-locating and supporting sealing means contained in a fitting at the top of the tube assembly.

4. The invention of claim 1 wherein the tube assembly comprises an outer tube and an inner non-magnetic, self-lubricating tube around which the coil is located, the rod and magnet being received plunger-wise in the inner tube.

5. The invention of claim 5 including air circulation vents in the inner tube.

6. The invention of claim 1 wherein the anchoring means includes a ballast foot on the base of the tube assembly.

7. The invention of claim 1 wherein the anchoring means includes means for securing guy wires to the tube assembly for anchoring in the seabed.

8. An undersea electrical generator comprising a static tube assembly, means for anchoring the assembly on the seabed, a float assembly extending from the tube assembly and including a freely rotatable elongate hull-shaped float for location at the water surface, the float being adapted to rise and fall responsive to wave motion and to self-align with respect to incoming waves, magnetic induction means within the tube assembly having components associated with the float and tube assemblies, respectively, for generating electrical current by magnetic induction responsive to rising and falling movements of the float, and means for providing a flow path for current produced by said induction means to the exterior of the tube assembly.

9. The invention of claim 8 wherein the induction means comprises an induction coil associated with the tube assembly and magnet means carried by the float assembly within the coil.

10. The invention of claim 9 wherein the length of the coil is sufficient to accommodate reciprocation of the magnet means through tidal and wave height variations so that the generator is substantially continuously current producing.

11. The invention of claim 8 wherein the anchoring means comprises a ballast foot on the base of the tube assembly and guy wires extending from the tube assembly for anchoring to the seabed and providing lateral stability to the generator.

12. The invention of claim 8 wherein the float has a flat lenticular-shaped upper surface and a hull-shaped lower surface.

* * * * *